United States Patent
Nozaki

(10) Patent No.: US 10,906,353 B2
(45) Date of Patent: Feb. 2, 2021

(54) STEEL CORD FOR REINFORCING RUBBER ARTICLE

(71) Applicant: BRIDGESTONE CORPORATION, Tokyo (JP)

(72) Inventor: Yusuke Nozaki, Tokyo (JP)

(73) Assignee: BRIDGESTONE CORPORATION, Tokyo (JP)

( * ) Notice: Subject to any disclaimer, the term of this patent is extended or adjusted under 35 U.S.C. 154(b) by 127 days.

(21) Appl. No.: 16/367,544

(22) Filed: Mar. 28, 2019

(65) Prior Publication Data

US 2019/0225018 A1 Jul. 25, 2019

Related U.S. Application Data

(63) Continuation-in-part of application No. 15/328,962, filed as application No. PCT/JP2015/071405 on Jul. 28, 2015, now abandoned.

(30) Foreign Application Priority Data

Jul. 28, 2014 (JP) .................................. 2014-153031

(51) Int. Cl.
*B60C 9/00* (2006.01)
*D07B 1/06* (2006.01)

(52) U.S. Cl.
CPC .......... *B60C 9/0007* (2013.01); *D07B 1/0613* (2013.01); *D07B 1/0626* (2013.01);
(Continued)

(58) Field of Classification Search
CPC . B60C 9/00; B60C 9/0007; B60C 2009/0071; B60C 2009/0078;
(Continued)

(56) References Cited

U.S. PATENT DOCUMENTS

| 3,413,799 A | 12/1968 | Lejeune |
| 4,827,708 A | 5/1989 | Verreet |

(Continued)

FOREIGN PATENT DOCUMENTS

| JP | 2000017587 A | 1/2000 |
| JP | 2009-114594 | 5/2009 |

(Continued)

OTHER PUBLICATIONS

Communication dated Jul. 17, 2017, from the European Patent Office in counterpart European application No. 15828200.4.

(Continued)

*Primary Examiner* — Ismael Izaguirre
(74) *Attorney, Agent, or Firm* — Sughrue Mion, PLLC

(57) ABSTRACT

Provided is a steel cord for reinforcing a rubber article which can further improve cut resistance when applied to a tire while maintaining the amount of steel to be used. A steel cord for reinforcing a rubber article comprising: one core strand 11 having a two-layered layered-twisted structure formed by twisting a plurality of steel filaments 1; and a plurality of sheath strands 12 having a layered-twisted structure formed by twisting a plurality of steel filaments 2, wherein the sheath strands are twisted around the core strand. A ratio dc/ds of a diameter dc of a sheath filament constituting the sheath of the core strand to a diameter ds of an outermost layer sheath filament constituting the outermost layer sheath of the sheath strand is more than 1.25 and not more than 1.50.

7 Claims, 1 Drawing Sheet

(52) U.S. Cl.
CPC .. *B60C 2009/0071* (2013.01); *B60C 2200/06* (2013.01); *D07B 2201/1014* (2015.07); *D07B 2201/202* (2013.01); *D07B 2201/2006* (2013.01); *D07B 2201/2009* (2013.01); *D07B 2201/2051* (2013.01); *D07B 2501/2046* (2013.01)

(58) Field of Classification Search
CPC .... B60C 2009/0085; B60C 2009/0092; B60C 2200/065; D07B 1/06; D07B 1/0613; D07B 1/0626; D07B 1/0606; D07B 1/062; D07B 1/0633; D07B 1/0673; D07B 1/068; D07B 1/0686; D07B 1/0693; D07B 1/16; D07B 2201/1014; D07B 2201/2006; D07B 2201/2009; D07B 2201/202; D07B 2201/2051; D07B 2201/2046

See application file for complete search history.

(56) References Cited

U.S. PATENT DOCUMENTS

| | | | |
|---|---|---|---|
| 6,863,103 B1* | 3/2005 | Masubuchi | B60C 9/0007 152/451 |
| 8,006,475 B2 | 8/2011 | Aoyama | |
| 8,601,782 B2* | 12/2013 | Nakamura | B60C 9/0007 57/218 |
| 2003/0201047 A1 | 10/2003 | Rayman | |
| 2011/0088825 A1 | 4/2011 | Kudo | |
| 2012/0043003 A1 | 2/2012 | Masubuchi | |
| 2012/0211310 A1 | 8/2012 | Peric et al. | |
| 2013/0032264 A1 | 2/2013 | Cheng et al. | |
| 2013/0206308 A1 | 8/2013 | Kitahara | |
| 2015/0368859 A1 | 12/2015 | Nishimura et al. | |

FOREIGN PATENT DOCUMENTS

| | | |
|---|---|---|
| JP | 2009-299223 A | 12/2009 |
| JP | 2011-042910 A | 3/2011 |
| JP | 2013-522493 A | 6/2013 |
| JP | 2013-227698 A | 11/2013 |
| JP | 5495412 | 3/2014 |
| WO | 2014/129300 A1 | 8/2014 |

OTHER PUBLICATIONS

International Search Report for PCT/JP2015/071405 dated Oct. 20, 2015.

* cited by examiner

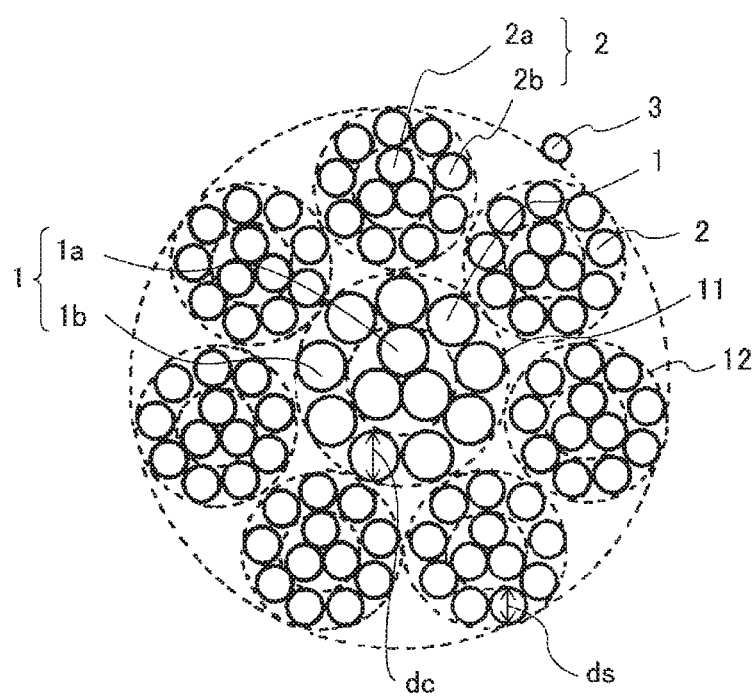

STEEL CORD FOR REINFORCING RUBBER ARTICLE

CROSS-REFERENCE TO RELATED APPLICATIONS

This application is a Continuation-in-part application of U.S. application Ser. No. 15/328,962 filed Jan. 25, 2017, which is a National Stage of International Patent Application No.: PCT/JP2015/071405 filed on Jul. 28, 2015, claiming priority based on Japanese Patent Application No.: 2014/153031 filed Jul. 28, 2014, the contents of all of which are incorporated herein by reference in their entirety.

TECHNICAL FIELD

The present invention relates to a steel cord for reinforcing a rubber article (hereinafter, also simply referred to as "cord"), and particularly to a steel cord for reinforcing a rubber article for use in reinforcing applications for rubber articles such as tires.

BACKGROUND ART

For a rubber article such as a tire, a steel cord formed by twisting a plurality of steel filaments is widely used as a reinforcing material. In particular, since a tire used for a heavy duty vehicle such as a construction vehicle is used under heavy loading on rough terrain having sharp rises or drops or the like, a steel cord to be used as a reinforcing material is demanded to have a particularly high strength and resistance. For this reason, in such a large tire, a steel cord having a so-called multi-twisted structure, which is formed by twisting a plurality of strands formed by twisting a plurality of steel filaments, is employed.

As a prior art relating to a steel cord having a multi-twisted structure, for example, Patent Document 1 discloses a technique in which, in a steel cord for reinforcing a rubber article having a multi-twisted structure formed by twisting a plurality of strands having a layered-twisted structure in which a plurality of steel filaments are twisted, the ratio dc/ds of the diameter dc of an outermost layer sheath filament constituting an outermost layer sheath of a core strand to the diameter ds of an outermost layer sheath filament constituting an outermost layer sheath of a sheath strand is set to from 1.05 to 1.25 to prevent the occurrence of a preceding break of an outermost layer filament, thereby improving the cord strength.

RELATED ART DOCUMENT

Patent Document

Patent Document 1: Japanese Unexamined Patent Application Publication No. 2009-299223 (Claims and the like)

SUMMARY OF THE INVENTION

Problems to be Solved by the Invention

For tires used in construction vehicles or the like, resistance to blunt or acute protrusions such as rocks, that is, cut resistance is also important. In order to increase the cut resistance in a cord having a multi-twisted structure, improvement of the resistance of a core strand to tightening of a sheath strand is considered, and a technique described in Patent Document 1 is also known.

However, under the demand for further improvement in the tire performance in recent years, realization of a tire whose cut resistance is further improved is also demanded. On the other hand, in recent years, there has been an increasing demand for weight reduction of tires in order to reduce loads on the environment. In order to reduce the weight of a tire, it is desirable to further improve the tire performance while avoiding an increase in the amount of steel.

Accordingly, an object of the present invention is to provide a steel cord for reinforcing a rubber article which can further improve cut resistance when applied to a tire while maintaining the amount of steel to be used.

Means for Solving the Problems

The present inventor intensively studied to find that the above-described problems can be solved by employing the following configuration, thereby completing the present invention.

That is, the steel cord for reinforcing a rubber article of the present invention is a steel cord for reinforcing a rubber article comprising: one core strand having a two-layered layered-twisted structure formed by twisting a plurality of steel filaments; and a plurality of sheath strands having a layered-twisted structure formed by twisting a plurality of steel filaments, wherein the sheath strands are twisted around the core strand, and wherein a ratio dc/ds of a diameter dc of a sheath filament constituting the sheath of the core strand to a diameter ds of an outermost layer sheath filament constituting the outermost layer sheath of the sheath strand is more than 1.25 and not more than 1.50.

In the cord of the present invention, preferably, the number of the sheath strands is from 7 to 9. In the cord of the present invention, preferably, all filaments constituting the core strand have the same diameter. Further, in the cord of the present invention, preferably, a cord diameter is not less than 5.00 mm.

A pneumatic tire of the present invention is characterized in that the steel cord for reinforcing a rubber article of the present invention is used as a reinforcing material.

Effects of the Invention

According to the present invention, it becomes possible to realize a steel cord for reinforcing a rubber article which can further improve cut resistance when applied to a tire while maintaining the amount of steel to be used.

BRIEF DESCRIPTION OF THE DRAWING

FIG. 1 is a cross-sectional view in the width direction illustrating one configuration example of a steel cord for reinforcing a rubber article of the present invention.

MODE FOR CARRYING OUT THE INVENTION

Hereinafter, embodiments of the present invention will be described in detail with reference to the drawing.

FIG. 1 is a cross-sectional view in the width direction illustrating one configuration example of a steel cord for reinforcing a rubber article of the present invention. As illustrated in the drawing, the cord of the present invention comprises: one core strand 11 having a two-layered layered-twisted structure formed by twisting a plurality of steel filaments 1; and a plurality of (in the illustrated example, seven) sheath strands 12 each having two-layered layered-twisted structure formed by twisting a plurality of steel filaments 2, and has a multi-twisted structure formed by twisting the sheath strands 12 around the core strand 11. In the illustrated cord, the core strand 11 has a 3+9 structure in which a sheath is formed by twisting nine sheath filaments 1b around a core composed of twisted three core filaments 1a, and the sheath strand 12 has a 3+9 structure in which a sheath is formed by twisting nine sheath filaments 2b around a core composed of twisted three core filaments 2a. In the illustrated cord, a spiral filament 3 is spirally wound around the outer periphery of the sheath strand 12.

In the present invention, it is important that the ratio dc/ds of the diameter dc of the sheath filament 1b constituting the sheath of the core strand 11 to the diameter ds of the outermost layer sheath filament 2b constituting the outermost layer sheath of the sheath strand 12 is more than 1.25 and not more than 1.50. In order to improve the cut resistance of a cord, it is effective to further increase the thickness of the outermost layer filament of the core strand. However, when the core strand has three layers, the cord diameter becomes thick, the amount of steel increases, which contradicts a demand for weight reduction. For this reason, in the present invention, the value of the ratio dc/ds has been defined while limiting the core strand 11 to a two-layered layered-twisted structure.

The value of the above-described ratio dc/ds needs to be more than 1.25 and not more than 1.50, and preferably, is within the range of from 1.27 to 1.42. By setting the value of the ratio dc/ds to be in the range of more than 1.25 and not more than 1.50, the shear stress between filaments acting between a core strand and a sheath strand is relaxed. By this, the core strand 11 can have strength sufficient to endure the tightening force of the sheath strand 12. As a result, by improving the shear resistance of the cord itself, the cut resistance of the cord can be improved. Patent Document 1 specifies the ratio dc/ds within the range of 1.05 to 1.25, and describes that, when the ratio dc/ds exceeds 1.25 and becomes a large value, preceding break of filaments occurs between the core strand and the sheath strand. The present inventor intensively studied to find that, by limiting the core strand 11 to have a two-layered layered-twisted structure, a shear stress is relaxed even in the range of the ratio dc/ds>1.25, whereby the shear resistance of the cord is improved. When the dc/ds is not more than 1.25, the effect of improving the shear resistance of the cord is small in the two-layered layered-twisted structure of the core strand, and when the dc/ds exceeds 1.50, the diameter of ds becomes too small as compared with dc, whereby there is a high possibility that the outermost layer sheath filament constituting the outermost layer sheath of the sheath strand 12 undergoes a preceding break.

In the cord of the present invention, the number of layers of the layered-twisted structure of the sheath strand 12 is not particularly limited, and may be, for example, from 2 to 3. In this case, assuming that a first sheath and a second sheath are sequentially formed from the inner layer of the layered-twisted structure, when the sheath strand 12 has a two-layered layered-twisted structure, the outermost layer sheath of the sheath strand 12 is the first sheath, and when the sheath strand 12 has a three-layered layered-twisted structure, the outermost layer sheath of the sheath strand 12 is the second sheath.

In the cord of the present invention, the number of the sheath strand 12 is preferably from 7 to 9. When all the core strand and sheath strands have the same diameter and the sheath strands are close-packed without a gap therebetween, six sheath strands can be arranged. However, as illustrated in the drawing, in the present invention, since the diameter of the sheath strand 12 is smaller than that of the core strand 11, seven to nine sheath strands 12 can be arranged. Accordingly, by setting the number of the sheath strands 12 to from 7 to 9, it is possible to further improve the resistance of the core strand to the tightening force of the sheath strand, and to further improve the cut resistance of the cord.

In the cord of the present invention, as illustrated in the drawing, it is preferable that all the filaments 1 constituting the core strand 11 have the same diameter. Although it is possible to improve the shear resistance by making the diameter of the core filament 1a smaller than the diameter of the sheath filament 1b in the core strand 11, when the core strand 11 has a two-layered layered-twisted structure as in the present invention, the diameter of the core filament 1a of the core strand 11 is preferably set to the same diameter as that of the sheath filament core 1b. This makes it easier to secure a space for arranging the sheath filament 1b in the core strand 11.

Further, the cord diameter of the cord of the present invention is preferably 5.00 mm or more, for example, from 5.00 to 6.00 mm. By using a cord having a diameter of 5.00 mm or more, it is possible to secure both strength and cut resistance required, particularly for large tires used for heavy duty vehicles such as construction vehicles.

In the cord of the present invention, the wire diameter and tensile strength of the filament to be used, the twisting direction, the twisting pitch, and the like of the filament or strand are not particularly limited, and can be appropriately selected according to the ordinary method as desired. For example, as the filament, a so-called high tensile strength steel having a carbon content of 0.80% by mass or more can be used. The cord of the present invention may or may not include a spiral filament.

Since the cord of the present invention is excellent in cut resistance, it is particularly suitable for a reinforcing material of large tires used for heavy duty vehicles such as construction vehicles, among others, ultra-large off-road radial tires having a tire size of about 40.00 R57. Such a large tire usually comprises: one or more carcasses composed of plies of steel cords extending in the radial direction between a pair of bead cores; at least four belt-crossing layers arranged radially outside the crown portion of the crown portion; and a tread disposed outside in the tire radial direction. The cord of the present invention can be used, for example, as a reinforcing cord for a belt crossing layer in such a tire.

EXAMPLES

Hereinafter, the present invention will be described in more detail by way of examples. All the examples except for Examples 2 and 3 are prophetic examples (paper examples), and all the comparative examples except for Comparative examples 1, 2 and 4 are prophetic comparative examples (paper comparative examples).

As shown in the following Tables, the ratio dc/ds of the diameter dc of the sheath filament constituting the outermost layer sheath of the core strand to the diameter ds of the sheath filament constituting the outermost layer sheath of the sheath strand was changed by changing the cord structure, to prepare steel cords for reinforcing a rubber article of Examples 2 and 3 and Comparative Examples 1, 2 and 4, in which a plurality of sheath strands having a layered-twisted structure were twisted around one core strand having a layered-twisted structure. The results of the following evaluations for the obtained cords of Examples 2 and 3 and Comparative Examples 1, 2 and 4 are also shown in the following Tables.

As also shown in the following Tables, the ratio dc/ds of the diameter dc of the sheath filament constituting the outermost layer sheath of the core strand to the diameter ds of the sheath filament constituting the outermost layer sheath of the sheath strand is changed by changing the cord structure, to prepare steel cords for reinforcing a rubber article of Examples 1 and 4-6 and Comparative Examples 3 and 5, in which a plurality of sheath strands having a layered-twisted structure are twisted around one core strand having a layered-twisted structure. Evaluations for the cords of Examples 1 and 4-6 and Comparative Examples 3 and 5 are also shown in the following Tables.

(Shear Resistance)

For each of the obtained cords of Examples 2 and 3 and Comparative Examples 1, 2 and 4, shear fracture resistance was evaluated using a Charpy impact tester. The results were indexed for Examples 2 and 3 and Comparative Examples 1, 2 and 4 with the cord of Comparative Example 1 taken as 100. The larger the numerical value is, the more excellent the shear resistance is, which is favorable.

For each of the cords of Examples 1 and 4-6 and Comparative Examples 3 and 5, shear fracture resistance is evaluated using a Charpy impact tester. The results are indexed for Examples 1 and 4-6 and Comparative Examples 3 and 5 with the cord of Comparative Example 1 taken as 100. The larger the numerical value is, the more excellent the shear resistance is, which is favorable.

(Steel Amount)

For each of Examples 2 and 3 and Comparative Examples 1, 2 and 4, the amount of steel per unit length of each of the obtained cord was measured and indexed with the cord of Comparative Example 1 taken as 100. The smaller the numerical value is, the less the amount of steel is, which is excellent in light weight.

For each of Examples 1 and 4-6 and Comparative Examples 3 and 5, the amount of steel per unit length of each of the obtained cord is measured and indexed with the cord of Comparative Example 1 taken as 100. The smaller the numerical value is, the less the amount of steel is, which is excellent in light weight.

For each of Examples 2 and 3 and Comparative Examples 1, 2 and 4, shear resistance (index)/steel amount ratio (index) was calculated from the viewpoint of evaluation of the balance between shear resistance and light weight, and the calculated value was indexed with the value of Comparative Example 1 taken as 100. It can be said that the larger the numerical value is, the better the shear resistance and the light weight are provided in a well-balanced manner.

For each of Examples 1 and 4-6 and Comparative Examples 3 and 5, shear resistance (index)/steel amount ratio (index) is calculated from the viewpoint of evaluation of the balance between shear resistance and light weight, and the calculated value is indexed with the value of Comparative Example 1 taken as 100. It can be said that the larger the numerical value is, the better the shear resistance and the light weight are provided in a well-balanced manner.

TABLE 1

| | | Comparative Example 1 | Comparative Example 2 | Comparative Example 3 | Comparative Example 4 | Comparative Example 5 |
|---|---|---|---|---|---|---|
| | Cord structure | 1 + 7 | 1 + 7 | 1 + 7 | 1 + 6 | 1 + 7 |
| Core strand | Structure | 3 + 8 + 10 | 3 + 8 + 10 | 3 + 8 + 10 | 3 + 7 + 13 | 3 + 8 |
| | Core filament diameter (mm) | 0.320 | 0.310 | 0.330 | 0.240 | 0.565 |
| | First sheath filament diameter (mm) | 0.320 | 0.310 | 0.330 | 0.340 | 0.565 |
| | Second sheath filament diameter (mm) | 0.455 | 0.455 | 0.475 | 0.340 | — |
| Sheath strand | Structure | 3 + 8 | 3 + 8 | 3 + 8 | 3 + 9 + 12 | 3 + 8 |
| | Core filament diameter (mm) | 0.385 | 0.390 | 0.385 | 0.240 | 0.375 |
| | First sheath filament diameter (mm) | 0.385 | 0.390 | 0.385 | 0.240 | 0.375 |
| | Second sheath filament diameter (mm) | — | — | — | 0.340 | — |
| Cord | Cord diameter (mm) | 5.44 | 5.44 | 5.52 | 5.23 | 5.46 |
| | Ratio dc/ds | 1.18 | 1.17 | 1.23 | 1.00 | 1.51 |
| | Shear resistance (index) | 100 | 102 | 99 | 96 | 99 |
| | Steel amount (index) | 100 | 102 | 100 | 102 | 99 |
| | Shear resistance/steel amount ratio (index) | 100 | 100 | 99 | 94 | 100 |

TABLE 2

| | | Example 1 | Example 2 | Example 3 | Example 4 | Example 5 | Example 6 |
|---|---|---|---|---|---|---|---|
| | Cord structure | 1 + 7 | 1 + 7 | 1 + 7 | 1 + 8 | 1 + 8 | 1 + 9 |
| Core strand | Structure | 3 + 8 | 3 + 8 | 3 + 8 | 3 + 8 | 3 + 8 | 3 + 8 |
| | Core filament diameter (mm) | 0.510 | 0.520 | 0.540 | 0.540 | 0.540 | 0.540 |
| | First sheath filament diameter (mm) | 0.510 | 0.520 | 0.540 | 0.540 | 0.540 | 0.540 |
| | Second sheath filament diameter (mm) | — | — | — | — | — | — |
| Sheath strand | Structure | 3 + 8 | 3 + 8 | 3 + 8 | 3 + 8 | 3 + 8 | 1 + 6 |
| | Core filament diameter (mm) | 0.380 | 0.395 | 0.385 | 0.290 | 0.300 | 0.385 |
| | First sheath filament diameter (mm) | 0.400 | 0.395 | 0.385 | 0.380 | 0.370 | 0.385 |
| | Second sheath filament diameter (mm) | — | — | — | — | — | — |
| Cord | Cord diameter (mm) | 5.36 | 5.44 | 5.44 | 5.01 | 5.02 | 4.55 |
| | Ratio dc/ds | 1.28 | 1.32 | 1.40 | 1.42 | 1.46 | 1.40 |
| | Shear resistance (index) | 109 | 112 | 108 | 104 | 100 | 87 |
| | Steel amount (index) | 101 | 102 | 100 | 98 | 96 | 85 |
| | Shear resistance/steel amount ratio (index) | 108 | 110 | 108 | 106 | 104 | 102 |

As can be seen from the results in the above Tables, in each of the cords of Examples 2 and 3 in which a plurality of sheath strands having a layered-twisted structure were twisted around one core strand having a two-layered layered-twisted structure, and the value of the ratio dc/ds satisfied a predetermined range, it is obvious that the shear resistance was improved while suppressing an increase in the amount of steel.

DESCRIPTION OF SYMBOLS 1, 2 Steel filament
1*a*, 2*a* Core filament
1*b*, 2*b* Sheath filament
3 Spiral filament
11 Core strand
12 Sheath strand

The invention claimed is:

1. A steel cord for reinforcing a rubber article comprising:
one core strand having a two-layered layered-twisted structure formed by twisting a plurality of steel filaments; and a plurality of sheath strands having a layered-twisted structure formed by twisting a plurality of steel filaments, wherein the sheath strands are twisted around the core strand,
wherein a ratio dc/ds of a diameter dc of a sheath filament constituting the sheath of the core strand to a diameter ds of an outermost layer sheath filament constituting the outermost layer sheath of the sheath strand is more than 1.25 and not more than 1.50,
wherein a number of layers of the layer-twisted structure of the sheath strands is 2 to 3, and
wherein the number of the sheath strands is from 7 to 9.

2. The steel cord for reinforcing a rubber article according to claim 1, wherein
all filaments constituting the core strand have the same diameter.

3. The steel cord for reinforcing a rubber article according to claim 1, wherein
a cord diameter is not less than 5.00 mm.

4. A pneumatic tire, wherein the steel cord for reinforcing a rubber article according to claim 1 is used as a reinforcing material.

5. The steel cord for reinforcing a rubber article according to claim 1, wherein
the number of layers of the layered-twisted structure of the sheath strands is 2.

6. The steel cord for reinforcing a rubber article according to claim 1, wherein
the number of core filaments in each of the sheath strands is 3.

7. The steel cord for reinforcing a rubber article according to claim 1, wherein
the ratio dc/ds is from 1.27 to 1.42.

* * * * *